Mar. 3, 1925.

W. M. DAVIS

MOVING PICTURE SCREEN

Filed Feb. 5, 1920

1,528,533

INVENTOR:
Wilbur M. Davis.
By Craik + Langan
ATTORNEYS

Patented Mar. 3, 1925.

1,528,533

UNITED STATES PATENT OFFICE.

WILBUR M. DAVIS, OF WETHERSFIELD, CONNECTICUT, ASSIGNOR, BY MESNE ASSIGNMENTS, TO THE EUREKA-CINEMA CORPORATION, OF HARTFORD, CONNECTICUT, A CORPORATION OF DELAWARE.

MOVING-PICTURE SCREEN.

Application filed February 5, 1920. Serial No. 356,556.

*To all whom it may concern:*

Be it known that I, WILBUR M. DAVIS, of Wethersfield, in the county of Hartford and State of Connecticut, a citizen of the United States, have invented a new and useful Improvement in Moving-Picture Screens, of which the following is a full, clear, and exact description, reference being had to the accompanying drawings, forming a part of this specification in explaining its nature.

The present invention relates to an improvement in this type of moving-picture screens having separate display surfaces one raised above the other, both surfaces being illuminated by the light rays of the projector and each being capable of carrying a substantial representation of the projected image, the surfaces conjunctively displaying the picture. A screen of this type forms the subject-matter of a copending application filed by Frederick C. Rockwell and myself, Serial No. 278,722, filed February 24, 1919.

According to the screen shown in said application the structural parts are arranged to provide two general display surfaces one a plane surface and the other a surface or face presented by a raised grille, which forms a multiplicity of shallow depressions or pockets over the plane surface forming the bottom of these pockets or bottom surface of the screen as opposed to the top or raised surface presented by the grille.

While both the top and bottom surfaces of the screen as heretofore made are directly exposed to the light rays of the projector owing to the shallowness of the pockets and are also substantially unshadowed by the side walls of the pockets presented by the raised structure, which in practice is only about $\frac{1}{10}$ of an inch in height, yet under some circumstances I have noted a slight tendency for the casting of shadows, which it is one object of my invention to eliminate.

A further object of my invention is to give greater efficiency to the type of screen referred to when images projected upon it are viewed from the side or at an angle other than one normal to the screen.

As will later be more fully explained, my invention resides essentially in the idea of providing another or third display surface which is exposed directly to the light rays of the projector and is capable of carrying a substantial representation of the projected image. This additional or third display surface is one between the bottom and raised surfaces heretofore referred to and is provided by the side walls of the raised structure or grille, all of which can best be seen and understood by reference to the drawings, in which—

Referring to the drawings:—

Figure 1:
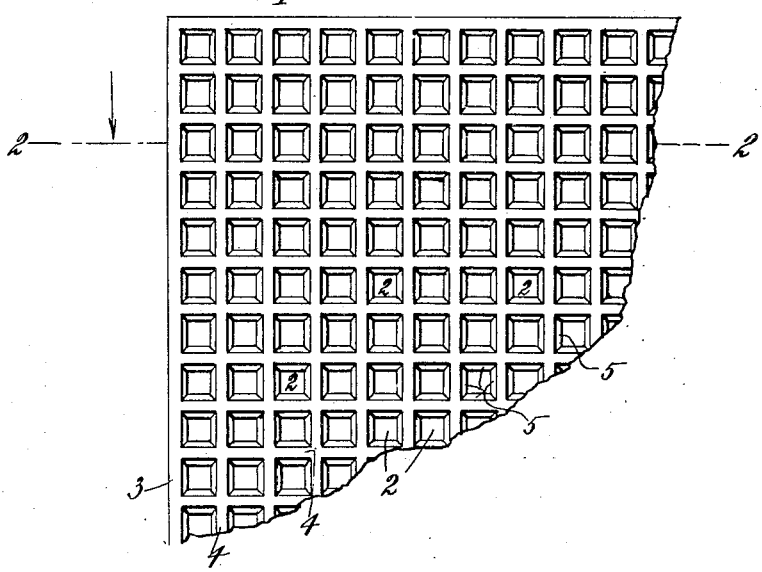
Figure 1 is a plan of a type of screen embodying my invention.
Figure 2:
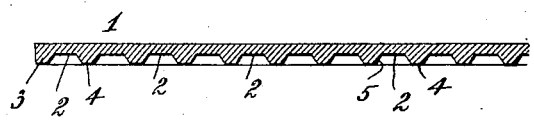
Fig. 2 is a section on line 2—2 of Fig. 1.

1 represents the base portion of the screen presenting a plane surface or face 2. 3 represents the raised portion of the screen presenting a top surface or face 4 and side surface or face 5 interposed between the top and bottom surfaces. All the surfaces are presented from off one side or display side of the screen.

The raised portion of the screen comprises a network or grille with bars running on cross lines forming a multiplicity of depressions or pockets over the plane or bottom surface 2 which forms the bottom of these pockets. The top or raised surface 4 is that presented by the front faces of the bars of the grille and the side surface or surfaces 5 interposed between the bottom and raised surfaces is obtained by beveling the sides of the bars of the grille or that portion thereof which forms the side walls of the respective pockets. All of the surfaces presented by the screen are surfaces directly exposed to the light rays of the projector and each is of sufficient area to permit of its carrying a substantially representatiton of the projected image. In practice the structure 3 is raised $\frac{1}{10}$ of an inch from the plane surface 2 of the screen, the respective bars of the grille each having a face width of about $\frac{1}{8}$ of an inch. The beveled side faces of the bars or those portions forming the side walls of the several pockets are inclined at an angle of about 45 degrees from the normal and present a face of about $\frac{1}{8}$ of an inch in depth. The spacing of the bars of the grille is also such that the plane surface 2 at the bottom of each pocket will present a surface area about $\frac{1}{16}$ of an inch square. I do not confine myself to these dimensions, but they have been found very efficient in practice.

A screen with display surfaces arranged as described possesses all the advantages of giving softness, a stereoscopic effect and atmospheric depth to the projected image as does the screen of which it constitutes an improvement and with better effects since the illumination of the side walls of the several pockets, exposed as they are to the light rays of the projector, tends to illuminate any shadows that might be cast by the side walls of the grille.

The making of a display surface or surfaces out of the side walls of the respective depressions or pockets enables the screen to display clear and undistorted images when viewed from a side angle near the screen. In fact, the entire picture-displaying capacity of the screen is materially increased.

It is also to be noted that the screen is made up of several display surfaces and these surfaces are composed of a multitude of small surfaces occupying a variety of positions relatively to one another as regards plane and angularity. This enables the screen to absorb much of the light that would otherwise be reflected and tends to a better diffusion of light, both relieving eye strain.

The screen may be made in any suitable manner. The grille may be applied separately to the base portion of the screen or the several surfaces may be obtained by embossing, pressing or moulding on metal, wood, fibre, paper or any plastic material or textile fabric.

I do not confine myself as to the shape or design of the pockets or depressions provided the display surfaces are obtained substantially in accordance with the principles above outlined and these surfaces are sufficient to display a suitable proportion of the projected picture.

Having thus fully described my invention, I claim and desire to secure by Letters Patent of the United States:—

1. A moving-picture display screen having, all on one side thereof, faces affording two display surfaces, one raised above the other, and other faces, interposed between said display surfaces, affording an additional display surface.

2. A moving-picture display screen having all on one side thereof, two display surfaces, one raised above the other, and inclined faces interposed between said display surfaces and affording another display surface.

3. A moving-picture display screen having a body with a face presenting a display surface, and a structure elevated relatively to said body provided with top and side faces forming separate display surfaces elevated relatively to the display surface presented by said body.

4. A moving-picture display screen having a body with a face presenting a display surface, and a structure elevated relatively to said body and provided with top faces co-operating with one another to present a display surface raised above the display surface presented by said body, said elevated structure being provided, also, with inclined side faces interposed between said display surfaces and co-operating with one another to present an additional display surface, each of said display surfaces being capable of carrying a substantial representation of the picture and conjunctively displaying the picture.

5. A picture screen comprising depressions having flat bottoms and sloping sides and with flat surfaces bordering each of the depressions.

WILBUR M. DAVIS.